April 7, 1925. 1,532,786
H. SUNDHAUSSEN
SPARKLESS CIRCUIT CONNECTION
Filed Feb. 19, 1915
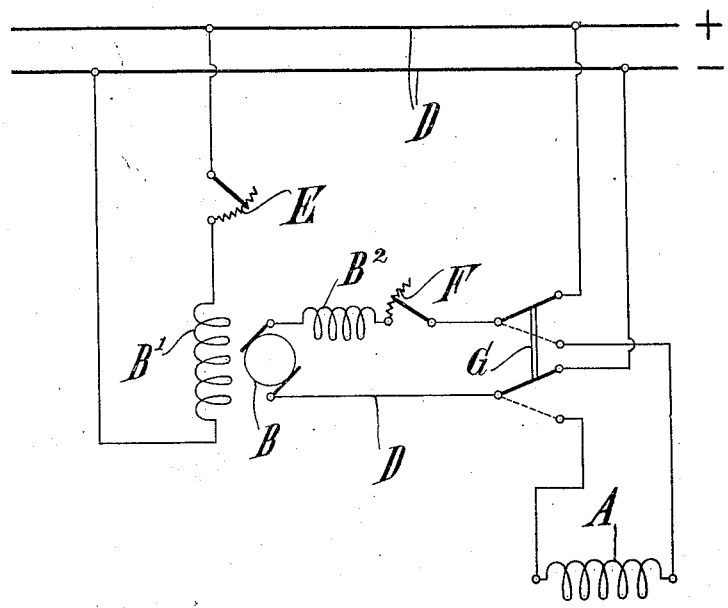

Patented Apr. 7, 1925.

1,532,786

UNITED STATES PATENT OFFICE.

HERMANN SUNDHAUSSEN, OF BREDENEY-ON-THE-RUHR, GERMANY, ASSIGNOR TO FRIED. KRUPP AKTIENGESELLSCHAFT, OF ESSEN-ON-THE-RUHR, GERMANY.

SPARKLESS CIRCUIT CONNECTION.

Application filed February 19, 1915. Serial No. 9,348.

(GRANTED UNDER THE PROVISIONS OF THE ACT OF MARCH 3, 1921, 41 STAT. L., 1313.)

*To all whom it may concern:*

Be it known that I, HERMANN SUNDHAUSSEN, residing at Bredeney-on-the-Ruhr, a citizen of the German Empire, have invented a certain new and useful Improvement in Sparkless Circuit Connections, of which the following is a specification.

The present invention has for its object a connection for sparkless breaking of a circuit influenced by self-induction and intended for currents of short duration, and is distinguished by peculiar simplicity.

One embodiment of the present invention is illustrated in the accompanying drawing giving diagrammatic representation of a connection intended for the exciting circuit of a magnet.

In the accompanying drawing, A denotes the exciting coil of the magnet, B the freely revoluble armature of a small dynamo and G a double-throw switch. The dynamo has an externally excited main field winding $B^1$, fed from a continuous current network D, the action of said main field winding being adjustable by means of a rheostat E, and an auxiliary field winding $B^2$ situated in the armature circuit together with a rheostat F appertaining thereto. Through the double-throw switch G the armature B of the dynamo B $B^1$ $B^2$ may be connected to the network D or to the member having self-induction, i. e. the exciting coil A.

The described connection operates as follows:

Before the exciting of the magnet, the double-throw switch G is so adjusted, as shown in full lines in the drawing, that the armature B of the dynamo B $B^1$ $B^2$ is connected with the network D, so that the dynamo runs as a motor. At the moment when the magnet is to be excited, the double-throw switch is brought into the position, indicated by dotted lines, in which position the dynamo is disconnected from the network D and connected with the coil A. The dynamo which has been running as a motor, is thereby converted into a generator, which sends current into the coil A. This current is, in the beginning, very strong and therefore effects a quick exciting of the magnet. During its delivery of current, the armature checks itself quickly; simultaneously the current strength sinks down to zero in the circuit B G A containing the coil A. The circuit may therefore be broken, by reversing the double-throw switch G without the appearance of the slightest spark.

The described connection is particularly useful in cases where it is necessary to protect the coil A from any voltage variations in the network D. For this purpose, the dynamo is given so slight a saturation, that the field strength is approximately proportionate to the number of ampere turns; and it is consequently attained, that the number of revolutions of the dynamo, when operating as a motor, remains approximately unchanged even when the network voltage considerably fluctuates. The kinetic energy of the armature B, which, on closing the circuit containing the coil A delivers the necessary electric energy for exciting the coil, is therefore always of the same magnitude. Consequently, the generated amount of heat, is also independent of voltage fluctuations, so that the coil A may easily be protected from inadmissible heating.

The described connection also permits a convenient adjustment of the magnetic retardation. This adjustment may be accomplished either with the assistance of the rheostat E or the rheostat F, as the magnitude of the resistance in the rheostat E influences the time constant of the circuit, and the magnitude of the resistance in the rheostat F influences the starting time of the electric motor and consequently also the time for the current to pass over the coil A.

I claim:—

1. A device for exciting a magnet coil with a current of comparatively short duration and avoiding sparks on interrupting the circuit which includes said coil, said device comprising an electro-dynamic condenser, an external source of voltage, and a double-throw switch adapted to connect said electro-dynamic condenser alternately to said source and to said magnet coil, said electro-dynamic condenser being formed by a dynamo having a stator winding connected to said source and a rotor winding connected to said double-throw switch, the rotor of said dynamo being free of any external mechanical load.

2. A device for exciting a magnet coil with a current of comparatively short duration and avoiding sparks on interrupting the circuit which includes said coil, said device comprising an electro-dynamic condenser, an external source of voltage, and a double-throw switch adapted to connect said electro-dynamic condenser alternately to said source and to said magnet coil, said electro-dynamic condenser being formed by a dynamo having a stator winding connected to said source and a rotor winding connected to said double-throw switch, the rotor of said dynamo being free of any external mechanical load, the magnetic field of said dynamo stator having so weak a saturation that the field strength is approximately proportionate with the current strength exciting said field.

The foregoing specification signed at Barmen, Germany, this 31st day of December, 1914.

HERMANN SUNDHAUSSEN. [L. S.]

In presence of—
HELEN NUFER,
ALBERT NUFER.